(12) United States Patent
Guillot et al.

(10) Patent No.: US 12,596,269 B2
(45) Date of Patent: Apr. 7, 2026

(54) LENS ELEMENT

(71) Applicant: Essilor International,
Charenton-le-pont (FR)

(72) Inventors: Matthieu Guillot, Charenton-le-pont
(FR); Bruno Fermigier,
Charenton-le-pont (FR); Carlos Rego,
Charenton-le-pont (FR); Eric Gacoin,
Charenton-le-pont (FR)

(73) Assignee: Essilor International,
Charenton-le-pont (FR)

( * ) Notice: Subject to any disclaimer, the term of this
patent is extended or adjusted under 35
U.S.C. 154(b) by 382 days.

(21) Appl. No.: 18/253,650

(22) PCT Filed: Nov. 26, 2021

(86) PCT No.: PCT/EP2021/083250
§ 371 (c)(1),
(2) Date: May 19, 2023

(87) PCT Pub. No.: WO2022/112535
PCT Pub. Date: Jun. 2, 2022

(65) Prior Publication Data
US 2024/0004220 A1     Jan. 4, 2024

(30) Foreign Application Priority Data

Nov. 27, 2020    (EP) ..................................... 20306463

(51) Int. Cl.
*G02C 7/04*      (2006.01)
*B29D 11/00*      (2006.01)
*G02C 7/06*      (2006.01)

(52) U.S. Cl.
CPC .......... *G02C 7/06* (2013.01); *B29D 11/00028*
(2013.01); *B29D 11/0048* (2013.01); *G02C
7/044* (2013.01); *G02C 2202/24* (2013.01)

(58) Field of Classification Search
None
See application file for complete search history.

(56) References Cited

U.S. PATENT DOCUMENTS 5,929,969 A *    7/1999   Roffman ................ G02C 7/042
                                                                   351/159.41
6,343,861 B1    2/2002   Kris et al.
(Continued)

FOREIGN PATENT DOCUMENTS

EP          2 175 306 A1      4/2010
JP          2-217818 A       8/1990
(Continued)

OTHER PUBLICATIONS

Korean Office Action issued Jan. 21, 2025 in Korean Patent Application No. 10-2023-7017094 (with English translation). 14 pages.
(Continued)

*Primary Examiner* — Darryl J Collins
(74) *Attorney, Agent, or Firm* — Oblon, McClelland,
Maier & Neustadt, L.L.P.

(57)          ABSTRACT

A lens element intended to be worn in front of an eye of a
wearer, the lens element including at least two first areas
having a refractive power based on a prescription of the
wearer for said eye of the wearer, a plurality of second areas
having at least a second optical function in specific wearing
conditions, where one can determine at least one first radial
path crossing at least a first second area in a first point and
a second point, the first and second points being adjacent to
the at least two first areas, the first radial coordinate being
greater than the second radial coordinate, and the radial
optical power at the first point is significantly different from
the radial optical power at the second point.

16 Claims, 6 Drawing Sheets

(56) References Cited

U.S. PATENT DOCUMENTS

| | | | |
|---|---|---|---|
| 7,506,983 B2* | 3/2009 | To | A61F 9/00 |
| | | | 351/246 |
| 8,950,860 B2 | 2/2015 | Tse et al. | |
| 2002/0075446 A1* | 6/2002 | Lossman | G02C 7/061 |
| | | | 351/159.67 |
| 2002/0135733 A1* | 9/2002 | Portney | G02C 7/068 |
| | | | 351/159.41 |
| 2009/0257026 A1 | 10/2009 | Varnas et al. | |
| 2010/0085536 A1 | 4/2010 | Drobe | |
| 2011/0317128 A1 | 12/2011 | Guilloux et al. | |
| 2013/0222761 A1* | 8/2013 | Hansen | G02C 7/048 |
| | | | 351/159.36 |
| 2014/0347622 A1 | 11/2014 | Wu | |
| 2017/0227790 A1 | 8/2017 | Lin et al. | |
| 2019/0064542 A1 | 2/2019 | Chen et al. | |
| 2019/0227342 A1 | 7/2019 | Brennan et al. | |
| 2019/0317339 A1 | 10/2019 | Lin et al. | |
| 2020/0150460 A1 | 5/2020 | Lin et al. | |
| 2023/0296917 A1* | 9/2023 | Braunger | B29D 11/00326 |
| | | | 351/159.41 |

FOREIGN PATENT DOCUMENTS

| | | | |
|---|---|---|---|
| JP | 2002-518705 | A | 6/2002 |
| JP | 2003-529468 | A | 10/2003 |
| JP | 2008-250316 | A | 10/2008 |
| JP | JP-2016-6507 | A | 1/2016 |
| JP | 2019-128599 | A | 8/2019 |
| WO | WO 99/66366 | A1 | 12/1999 |
| WO | WO 01/74570 | A2 | 10/2001 |
| WO | WO 2008/111856 | A1 | 9/2008 |
| WO | WO 2013/149303 | A1 | 10/2013 |
| WO | WO 2014/059465 | A1 | 4/2014 |
| WO | WO 2019/166659 | A1 | 9/2019 |

OTHER PUBLICATIONS

International Search Report mailed on Mar. 4, 2022 in PCT/EP2021/083250 filed on Nov. 26, 2021 (5 pages).
Written Opinion mailed on Mar. 4, 2022 in PCT/EP2021/083250 filed on Nov. 26, 2021 (9 pages).
Japanese Office Action issued May 7, 2024 in Japanese Application No. 2023-532398 with English translation, 19 pgs.

* cited by examiner

LENS ELEMENT

TECHNICAL FIELD

The disclosure relates to a lens element intended to be worn in front of an eye of a wearer. In particular, the disclosure relates to a lens element intended to be worn in front of an eye of a person to suppress or reduce progression of abnormal refractions of the eye such as myopia or hyperopia.

Furthermore, the disclosure relates to a mold for obtaining a lens element intended to be worn in front of an eye of a wearer.

BACKGROUND

Myopia of an eye is characterized by the fact that the eye focuses distant objects in front of its retina. Myopia is usually corrected using a concave lens and hyperopia is usually corrected using a convex lens.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time.

Foveal vision corresponds to viewing conditions for which the image of an object looked at is formed by the eye in the central zone of the retina, called the foveal zone.

Peripheral vision corresponds to the perception of elements of a scene that are offset laterally relative to the object looked at, the images of said elements being formed on the peripheral portion of the retina, away from the foveal zone.

The ophthalmic correction with which an ametropic subject is provided is usually adapted for his foveal vision. However, as is known, the correction has to be reduced for the peripheral vision relative to the correction that is determined for the foveal vision. In particular, studies carried out on monkeys have shown that strong defocusing of the light behind the retina, which occurs away from the foveal zone, may cause the eye to elongate and therefore may cause a myopia defect to increase.

Therefore, it appears that there is a need for a lens element that would suppress or at least slow down progression of abnormal refractions of the eye such as myopia or hyperopia.

SUMMARY

To this end, the disclosure proposes a lens element intended to be worn in front of an eye of a wearer, the lens element comprising:

- at least two first areas having a first optical function, the first optical function being based on a refractive power based on a prescription of the wearer for said eye of the wearer;
- a plurality of second areas having at least a second optical function in specific wearing conditions, wherein one can determine at least one first radial path (Pth_R($\theta1$)) crossing at least a first second area in a first point (<r1, $\theta1$>) and a second point (<r2, $\theta1$>), the first and second points being adjacent to the at least two first areas, the radial coordinate r2 being greater than the radial coordinate r1, and the radial optical power at the first point (<r1, $\theta1$>) is significantly different from the radial optical power at the second point (<r2, $\theta1$>).

Advantageously, the plurality of second areas having a second optical function create a non-focused image other than on the retina of the wearer which creates a signal for myopia and/or hyperopia control that reduces the natural tendency of the retina of the eye to deform, in particular to extend. Therefore, the progression of the abnormal refraction of the eye is slow down.

Furthermore, the non-focused image is not usable by the wearer and thus, is less disturbing thereby improving the comfort of the wearer.

According to further embodiments which can be considered alone or in combination:

- along the at least one first radial path (Pth_R($\theta1$)), the evolution of radial optical power between the first and second points is strictly monotonous; and/or
- one can further determine at least two points (<r3, $\theta2$>) and (<r4, $\theta2$>) included in the first second zone and defining a second radial path (Pth_R($\theta2$), and at least one orthoradial path (Pth_OR($\theta1,\theta2$)) between the first and second radial paths, the orthoradial optical power along the orthoradial path (Pth_OR($\theta1,\theta2$) being substantially constant, and the orthoradial path (Pth_OR ($\theta1,\theta2$)) being greater than or equal to 18 degree; and/or
- the first and second areas alternate over the lens element, and, wherein along at least one radial path crossing the at least one first area and at least one of the plurality of second areas, a transition of optical power between said adjacent first and second areas is discontinuous; and/or
- the first and second areas alternate over the lens element, and, wherein along at least one radial path crossing the at least one first area and at least one of the plurality of second areas, a transition of optical power between said adjacent first and second areas is continuous; and/or
- the altitude transition between adjacent first and second areas is continuous; and/or
- the altitude transition between adjacent first and second areas is discontinuous; and/or
- the second optical function is a non-spherical optical function; and/or
- the non-spherical function is an aspherical function; and/or
- the plurality of second areas are organized in complete or portions of concentric on or inside the lens element; and/or
- the second areas have different optical function; and/or
- at least two second areas have the same second optical function; and/or
- all the second areas have the same second optical function; and/or
- the second areas are centered on the optical center of the lens element on which they are disposed or in which they are encapsulated; and/or
- the second areas are comprised in an annular zone of the lens element defined between a diameter greater than or equal to 4.0 mm and a diameter smaller than or equal to 70 mm; and/or
- the plurality of second areas has a radial size comprised between 0.1 and 3.0 mm; and/or
- the second optical function varies with an eccentricity of the second areas to a geometrical center of the lens element; and/or the absolute value of the difference between the mean optical power of one point of the first areas and the mean optical power of one point of the second areas is comprised between 0.50 and 15.0 D. Preferably, the first and second points of the first and second areas are adjacent; and/or the absolute value of the difference between the radial optical power of one point of one of the second areas and the radial optical power of one point of the same second area is comprised between 0.25 and 20.0 D.; and/or the absolute value of the difference between the mean optical power of one point of one of the second areas and the mean optical power of one point of the same second area is comprised between 0.25 and 10.0 D.

The disclosure further relates to a mold for obtaining a lens element intended to be worn in front of an eye of a wearer, the mold comprising:

a first molding element having a first surface, a second molding element having a second surface, wherein the first surface of the first molding element and the second surface of the second element form a molding cavity in which a molding material is to be filed.

According to further embodiments which can be considered alone or in combination:

the mold further comprises a gasket having an inner and an outer surface, and wherein the inner surface of the gasket forms the molding cavity with the first surface of the first molding element and the second surface of the second element.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION

The disclosure relates to a lens element 10 intended to be worn in front of an eye of a wearer, and for example adapted for said wearer.

In the reminder of the description, terms like «up», «bottom», «horizontal», «vertical», «above», «below», «front», «rear» or other words indicating relative position may be used. These terms are to be understood in the wearing conditions of the lens element.

In the context of the present invention, the term "lens element" can refer to an uncut optical lens or a spectacle optical lens edged to fit a specific spectacle frame or an ophthalmic lens and an optical device adapted to be positioned on the ophthalmic lens. The optical device may be positioned on the front or back surface of the ophthalmic lens. The optical device may be an optical patch, or a film laminated on a lens, or a layer of coating deposited by inkjet for example. The optical device may be adapted to be removably positioned on the ophthalmic lens for example a clip configured to be clipped on a spectacle frame comprising the ophthalmic lens. Alternatively the lens is a contact lens.

A lens element 10 according to the disclosure is adapted for a wearer and intended to be worn in front of an eye of said wearer.

Figure 1:
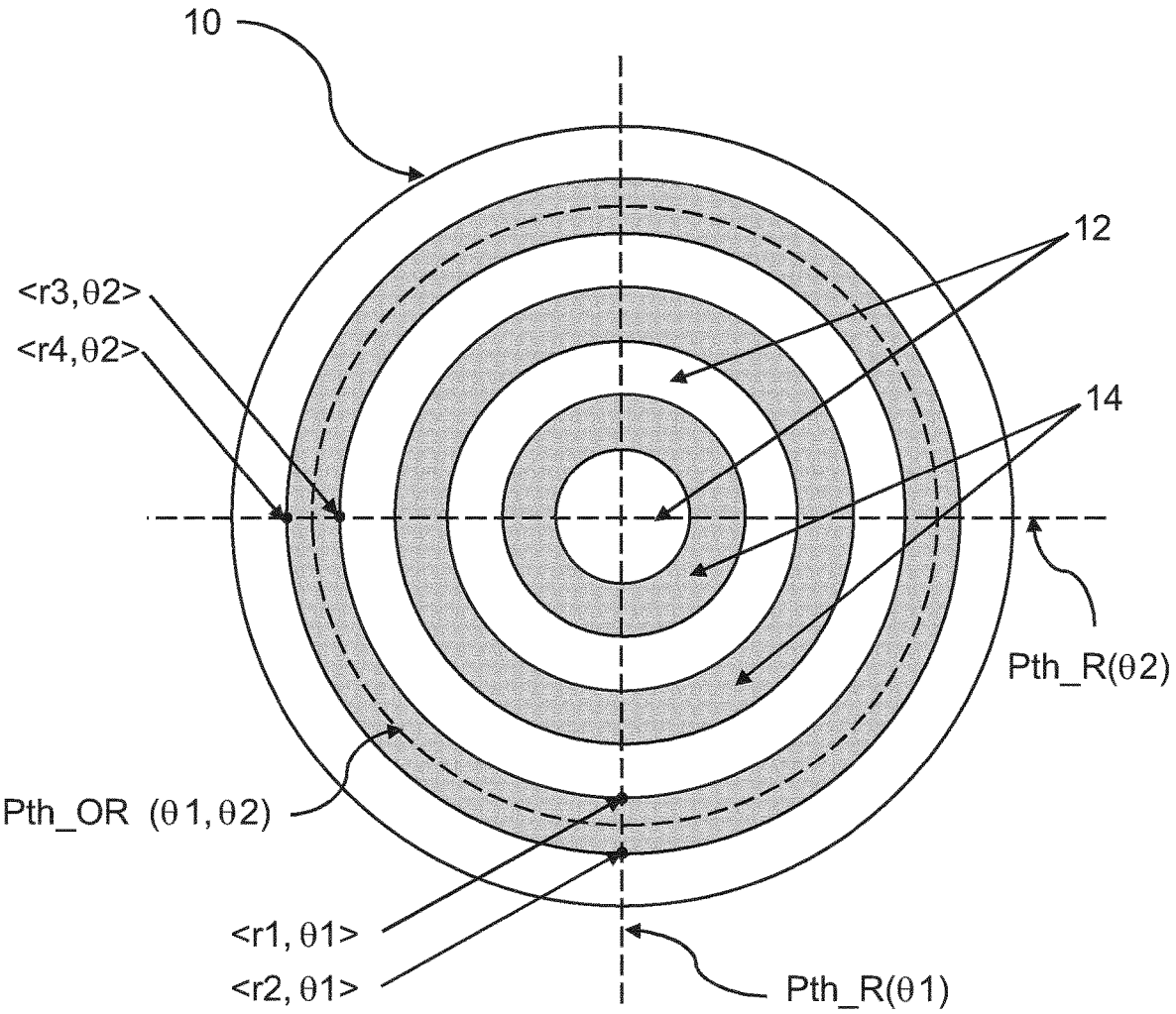
FIG. 1 illustrates a plan view of a lens element according to an embodiment of the disclosure.

As represented in FIG. 1, the lens element 10 according to the disclosure comprises at least two first areas 12. The first areas 12 have at least a first optical function, for example a refractive power based on a prescription of the wearer. In the sense of the invention, the term "based on a prescription" should be understood as being equal to the prescription value±0.5 D, preferably to the prescription value±0.12 D as defined in the ISO 8980 norm as published on the date of filing.

According to an embodiment of the disclosure, the first areas may have a first refractive power P1, for example a based on a prescription of the wearer, and a second refractive power P2 that differs from the first refractive power P1. Preferably, the first and second refractive powers P1 and P2 are carried by different first areas 12. The refractive power of the first areas may vary within said first areas. For example, the refractive power of the first areas may continuously vary between the first refractive power P1 and the second refractive power P2. Preferably, the refractive power of the first areas vary continuously along a radial axis. The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

The first areas 12 are configured to provide to the wearer in specific wearing conditions, for example standard wearing conditions, in particular for foveal vision, at least a first optical function configured to focus light on the retina of the wearer. The first optical function may be based on an optical power, for example a refractive power based on the prescription of the wearer for correcting an abnormal refraction of said eye of the wearer.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example, equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example, equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to $-8°$.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to $0°$.

An example of standard wearer condition may be defined by a pantoscopic angle of $-8°$, a Cornea to lens distance of 12 mm, a Pupil-cornea distance of 2 mm, a CRE to pupil distance of 11.5 mm, a CRE to lens distance of 25.5 mm and a wrap angle of $0°$.

Although the invention is not directed to progressive lenses, the wording used in this description is illustrated in FIGS. 1 to 10 of document WO2016/146590 for a progressive lens. The skilled person can adapt the definitions for single vision lenses.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in diopters.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and CURVmax is expressed in diopters.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labelled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}} \text{ and } SPH_{max} = (n-1)*CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}}, \text{ and}$$

$$SPH_{max} = (1-n)*CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:
if the surface is the object side surface, $$SPH_{mean} = \frac{n-1}{2}\left(\frac{1}{R_{min}} + \frac{1}{R_{max}}\right),$$

if the surface is an eyeball side surface, $$SPH_{mean} = \frac{1-n}{2}\left(\frac{1}{R_{min}} + \frac{1}{R_{max}}\right),$$

A cylinder CYL is also defined by the formula:

$$CYL=|SPH_{max}-SPH_{min}|$$

The characteristics of any aspherical face of the lens may be expressed by the local mean spheres and cylinders. A surface can be considered as locally non-spherical when the cylinder is at least 0.25 diopters.

Figure 4A:
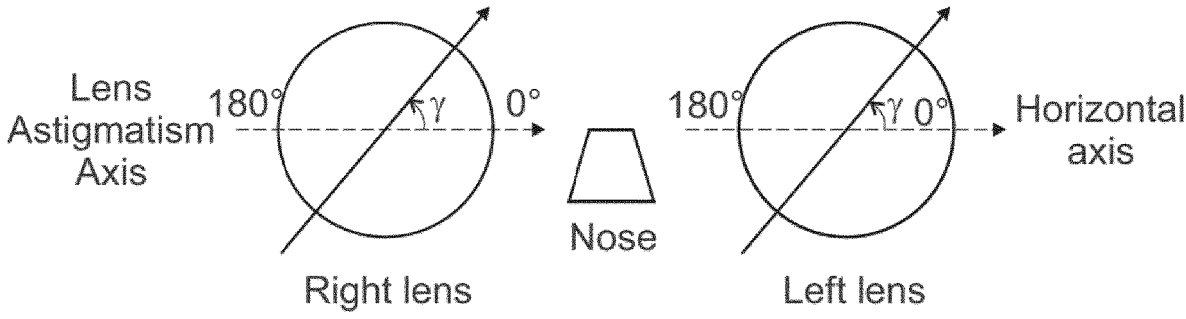
FIG. 4a illustrates the astigmatism axis γ of a lens in the TABO convention.
Figure 4B:
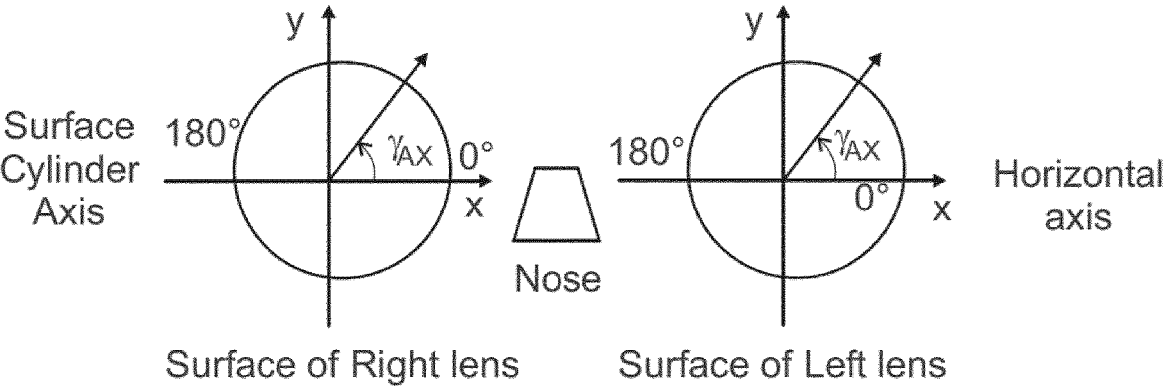
FIG. 4b illustrates the cylinder axis γAX in a convention used to characterize an aspherical surface.

For an aspherical surface, a local cylinder axis $\gamma AX$ may further be defined. FIG. 4a illustrates the astigmatism axis $\gamma$ as defined in the TABO convention and FIG. 4b illustrates the cylinder axis $\gamma AX$ in a convention defined to characterize an aspherical surface.

The cylinder axis $\gamma AX$ is the angle of the orientation of the maximum curvature CURVmax with relation to a reference axis and in the chosen sense of rotation. In the above defined convention, the reference axis is horizontal (the angle of this reference axis is $0°$) and the sense of rotation is counterclockwise for each eye, when looking at the wearer ($0°\le\gamma AX\le180°$). An axis value for the cylinder axis $\gamma AX$ of +450 therefore represents an axis oriented obliquely, which when looking at the wearer, extends from the quadrant located up on the right to the quadrant located down on the left.

Moreover, a progressive multifocal lens may also be defined by optical characteristics, taking into consideration the situation of the person wearing the lenses.

Figure 5:
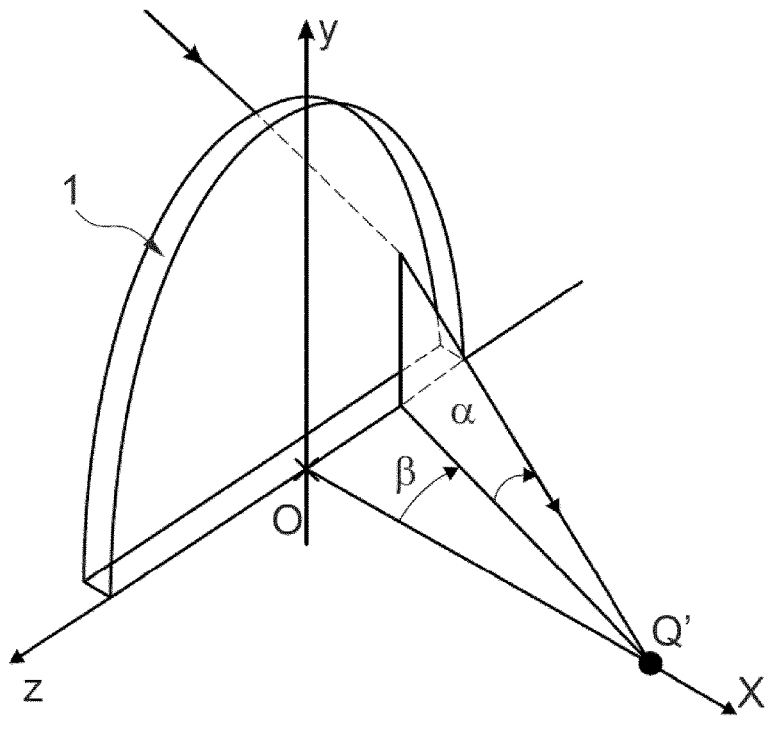
FIGS. 5 and 6 show, diagrammatically, optical systems of eye and lens.
Figure 6:
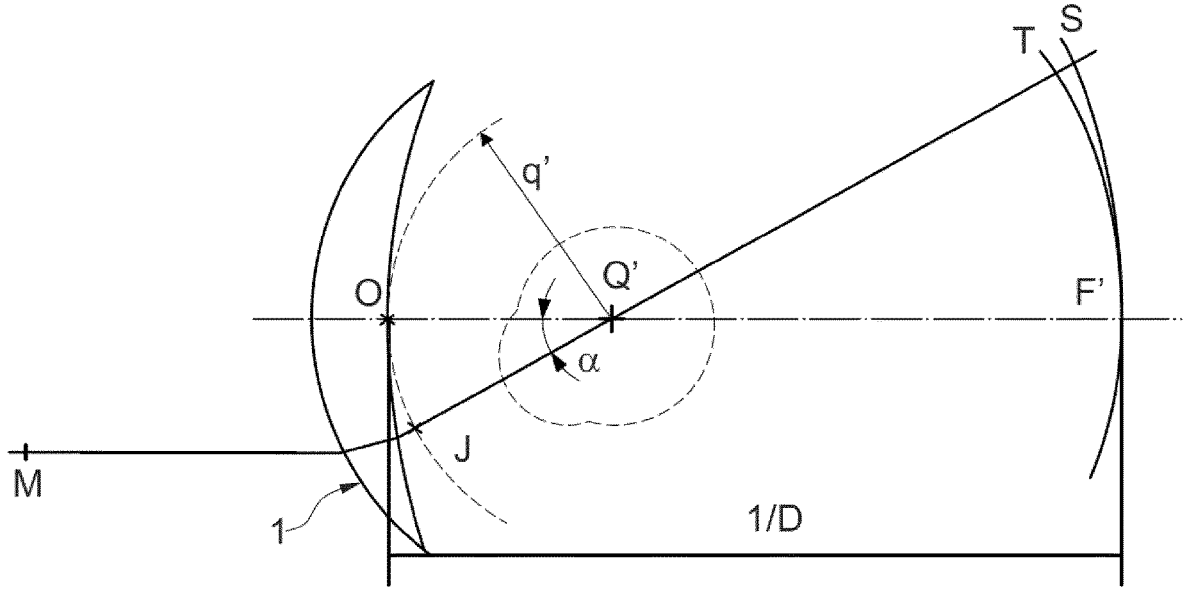

FIGS. 5 and 6 are diagrammatic illustrations of optical systems of eye and lens, thus showing the definitions used in the description. More precisely, FIG. 5 represents a perspective view of such a system illustrating parameters α and β used to define a gaze direction. FIG. 6 is a view in the vertical plane parallel to the antero-posterior axis of the wearer's head and passing through the center of rotation of the eye in the case when the parameter β is equal to 0.

The center of rotation of the eye is labelled Q'. The axis Q'F', shown on FIG. 6 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 5—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 5. The angle α is the angle formed between the axis Q'J and the projection of the straight line Q'J on the horizontal plane comprising the axis Q'F'; this angle appears on the scheme on FIGS. 5 and 6. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 350 and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modelling method. For a method of the invention, points may be at infinity or not. Ergorama may be a function of the wearer's ametropia or wearer's addition.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

$$ProxO = \frac{1}{MJ}$$

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as $$Ast = \left|\frac{1}{JT} + \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame {Q', xm, ym, zm} linked to the eye. It corresponds to the angle with which the image S or T i formed depending on the convention used with relation to the direction zm in the plane {Q', zm, ym}.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

At least one of the first areas 12 may be centered on a control point of the lens element. By control point, it should be understood any point of the lens element referenced as a control point. In particular, the control point may be the geometrical center of the lens element, the optical center of the lens element, a near vision reference point or a far vision reference point of the lens element.

According to an embodiment of the disclosure, the first area 12 centered on the control point has at least a first refractive power P1. A second first area 12 which is the closest to the first area centered on the control point may have a second refractive power P2.

As represented in FIG. 1, the lens element 10 according to the disclosure comprises a plurality of second areas 14. The second areas 14 have at least a second optical function in specific wearing conditions.

Preferably, the second optical function of the second areas differs from the first optical function of the first areas. For example, the absolute value of the difference between the mean optical power of one point of the first areas and the mean optical power of one point of the second areas is comprised between 0.50 and 15.0 D. Preferably, the first and second points of the first and second areas are adjacent.

The absolute value of the difference between the radial optical power of one point of one of the second areas and the radial optical power of one point of the same second area may be comprised between 0.25 and 20.0 D.

The absolute value of the difference between the mean optical power of one point of one of the second areas and the mean optical power of one point of the same second area is comprised between 0.25 and 10.0 D.

The second optical function of the second areas 14 may be a non-spherical optical function. For example, the non-spherical optical function is an aspherical optical function.

Advantageously, the second optical function in specific wearing conditions creates a non-focused image on and/or in front and/or behind the retina of the wearer. The non-focused image in front of the retina in case of myopia and behind the retina in case of hyperopia creates a control signal that reduces the natural tendency of the retina of the eye to deform, in particular to extend. The non-focused image is not usable by the wearer and thus, is less disturbing for him. In other words, the comfort of the wearer is greatly improved compared to a second optical function that would create a focused image on and/or in front and/or behind the retina of the wearer.

According to an embodiment of the disclosure, at least two, for example all, second areas have the same second optical function.

In another embodiment of the disclosure, the plurality of second areas 14 may have different optical functions. For example, the second optical function varies with the eccentricity of the second areas to a geometrical center of the lens element.

Figure 2:
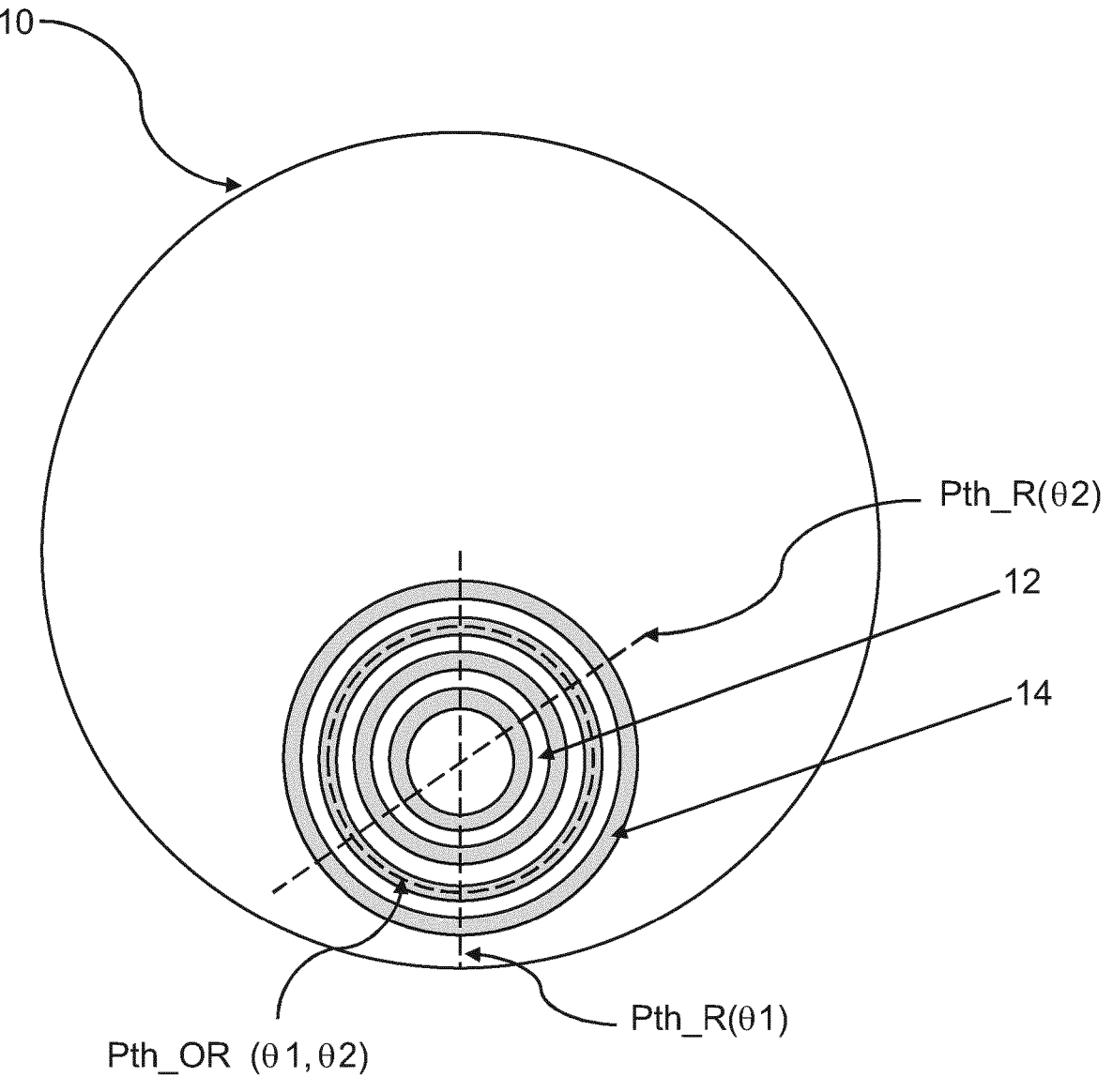
FIG. 2 illustrates a plan view of a lens element according to an embodiment of the disclosure.

As illustrated in FIGS. 1 and 2, the plurality of second areas 14 may be organized in complete concentric rings on or inside the lens element 10. Preferably, the projection of the concentric rings on an orthogonal plane have an identical center.

Figure 3:
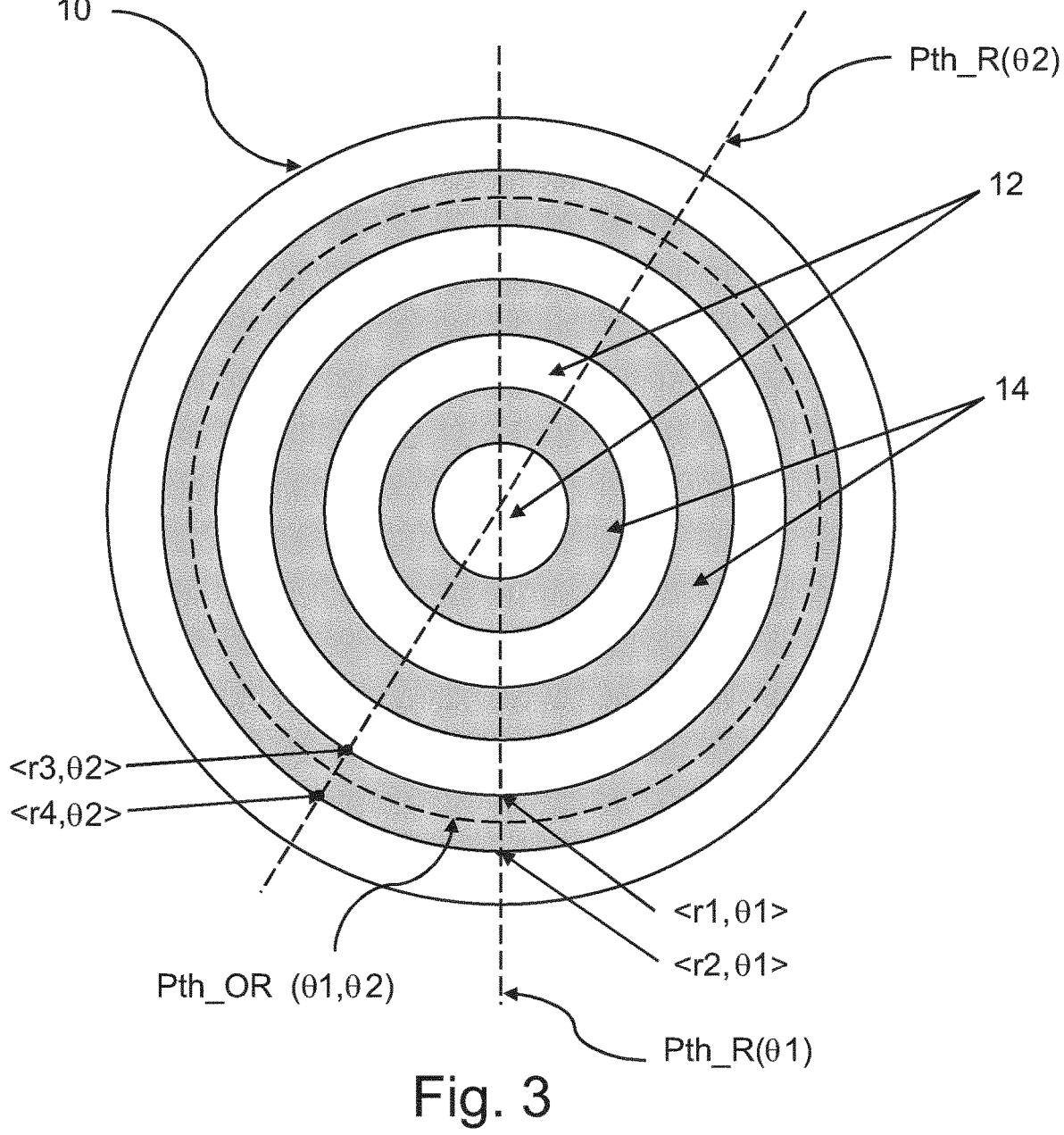
FIG. 3 illustrates a plan view of a lens element according to an embodiment of the disclosure.

According to another embodiment of the disclosure illustrated in FIG. 3, the second areas 14 are organized in portions of concentric rings on or inside the lens element 10. Preferably, the projection of the portions of concentric rings on an orthogonal plane have an identical center.

In the embodiment of the disclosure represented in FIGS. 1 and 3, the concentric rings are centered on the geometrical center of the lens element. Alternatively, the concentric rings of second areas may be centered on the optical center of the lens element.

In the embodiment of the disclosure represented in FIG. 2, the center of the concentric rings of second areas is disposed in the near vision area. Alternatively, the center of the concentric rings of second areas may be disposed in the far vision zone and/or in the nasal zone and/or the temporal zone.

The plurality of second areas 14 are comprised in an annular zone of the lens element defined between a diameter greater than or equal to 4.0 mm and a diameter smaller than or equal to 70 mm. Preferably, the annular zone is centered on the geometrical center of the lens element. More preferably, the annular zone is centered on the optical center of the lens element.

Alternatively, the lens element may comprise a far vision reference point, a near vision reference point, and a meridian joining the far and near vision reference points. For example, the lens element may comprise a progressive additional design adapted for the prescription of the person. The annular zone comprising the plurality of second areas may be centered on the near vision reference point or on the far vision reference point.

The plurality of second areas 14 have a radial size comprised between 0.1 and 3.0 mm, preferably, between 0.2 and 2.0 mm, more preferably between 0.5 and 1.5 mm, for example equal to 1.0 mm. In the sense of the invention, the radial size refers to half of the difference between the length of the outer diameter of an annular zone in which a single second area is inscribed and the length of the inner diameter of said annular zone.

As illustrated in FIG. 1, the lens element 10 comprises at least a first radial path (Pth_R($\theta$1)). The first radial path Pth_R($\theta$1) crosses at least a first second area 14 in a first point (<r1, $\theta$1>) and in a second point (<r2, $\theta$1>). Both, the first and second points (<r1, $\theta$1>) and (<r2, $\theta$1>) are adjacent to the at least one first area 12. The radial coordinate r2 of the second point is greater than the radial coordinate r1 of the first point. In other words, the second point (<r2, $\theta$1>) is closer to the periphery of the lens element 10 than the first point (<r1, $\theta$1>).

Advantageously, the radial optical power at the first point (<r1, $\theta$1>) is significantly different from the radial optical power at the second point (<r2, $\theta$1>).

In the sense of the disclosure, two radial optical powers are significantly different when the value of the difference is greater than or equal to 0.25 D. In other words, the radial optical power ROP at a point Ci is significantly different from the radial optical power at a point Pi if |ROP(Ci)−ROP(Pi)|≥0.25 D.

The radial optical power of the lens element is defined by the radial curvature of said lens element. In other words, the radial curvature of the lens element 10 can be calculated using the first derivative of the curvature of the lens element.

Similarly, the orthoradial optical power of the lens element is defined by the tangential curvature of said lens element. In other words, the orthoradial curvature of the lens element 10 can be calculated using the second derivative of the curvature of the lens element.

By considering a rotationally symmetrical surface described by:

$$z(\rho)=f(\rho)$$

The radial curvatures $C_r(\rho)$ can be defined as:

$$C_r(\rho) = \frac{f_{\rho\rho}}{\left(1 + f_\rho^2\right)^{3/2}}$$

The tangential curvature $C_t(\rho)$ can be defined as:

$$C_t(\rho) = \frac{f_\rho}{\rho\left(1 + f_\rho^2\right)^{1/2}}$$

Preferably, the evolution of radial optical power delta(n) *$C_r$ between the first point (<r1, $\theta$1>) and the second point (<r2, $\theta$1>) along the at least one first radial path (Pth_R($\theta$1)) is strictly monotonous. In the sense of the invention, a function is monotonous if and only if it is either entirely non-increasing, or entirely non-decreasing. By delta(n), it should be understood the difference between n2 and n1 when traversing a material of index n1 to a material of index n2.

As illustrated in FIG. 1, the lens element 10 may further comprise a second radial path (Pth_R(θ2)). The second radial path crosses at least the same first second area 14 in a third point (<r3, θ2>) and in a fourth point (<r4, θ2>). Both, the third and fourth points (<r3, θ2>) and (<r4, θ2>) are adjacent to at least the same first area 12. The radial coordinate r4 of the fourth point is greater than the radial coordinate r3 of the third point. In other words, the fourth point (<r4, θ2>) is closer to the periphery of the lens element 10 than the third point (<r3, θ2>).

The lens element 10 may further comprise at least one orthoradial path (Pth_OR(θ1,θ2)) included in the first second area. The orthoradial path (Pth_OR(θ1,θ2)) is defined in a zone of the second area 14 delimited by the first, second, third and fourth points (<r1, θ1>), (<r2, θ1>), (<r3, θ2>) and (<r4, θ2>). Preferably, the orthoradial path (Pth_OR(θ1,θ2)) is greater than or equal to 18 degrees.

Along the orthoradial path (Pth_OR(θ1,θ2)) the mean sphere power evolution is monotonous, for example, the mean sphere is substantially constant. Advantageously, along the orthoradial path (Pth_OR(θ1,θ2)) the orthoradial optical power delta(n)*$C_t$ evolution is monotonous, for example the orthoradial optical power $C_t$ is substantially constant. By substantially constant, it should be understood that the difference is strictly smaller than 0.50 D, preferably strictly smaller than 0.25 D, more preferably strictly smaller than 0.10 D.

Advantageously, the optical function of each of the second areas will not focus on optical axis but will create a caustic, for example a rotationally symmetrical caustic that generate the signal for myopia or hyperopia control that reduces the natural tendency of the retina of the eye to deform.

Advantageously, the absolute value of the difference between the radial optical power of one point of one of the second areas and the radial optical power of one point of the same second area is greater than 0.25 D and smaller or equal to 20.0 D.

Advantageously, the absolute value of the difference between the mean optical power of one point of one of the second areas and the mean optical power of one point of the same second area is greater than 0.25 D and smaller or equal to 10.0 D.

According to an embodiment of the disclosure, the first areas 12 and the second areas 14 alternate over the lens element 10.

Advantageously, this configuration ensures to have for each gaze direction both signals, i.e. the myopia/hyperopia correction through the first optical function and the myopia/hyperopia control through the second optical function, passing through the pupil of the wearer.

Along at least one radial path (Pth_R(θ)) crossing at least one first area 12 and at least one of the second areas 14, a transition of optical power between said adjacent first and second areas is discontinuous.

In the sense of the disclosure, the optical power transition between adjacent areas is discontinuous if along the path linking said adjacent optical elements, one can measure a "step" of optical power. By step, it should be understood an abrupt variation of optical power of at least 0.50 D.

Advantageously, this discontinuity allows better decorrelating the abnormal refraction correction generated by the first optical function from the blurred image generated by the second optical function. As such, the lens element according to the disclosure created a greater volume of non-focused light only in front and/or on and/or behind the retina of the wearer, creating a less disturbing second image having a better myopia and/or hyperopia control effect.

Alternatively, along at least one radial path (Pth_R(θ)) crossing at least one first area 12 and at least one of the second areas 14, the transition of optical power between said adjacent first and second areas is continuous.

In the sense of the disclosure, the optical power transition between adjacent areas is continuous if along the path linking said adjacent optical elements, one can measure a progressive variation of optical power. In other words, the transition is continuous if one cannot measure a "step" of optical power along the path linking them. By step, it should be understood an abrupt variation of optical power of at least 0.50 D.

The altitude transition between the first and second areas alternating on the lens element may be continuous.

In the sense of the disclosure, the altitude transition between adjacent areas is continuous if along the path linking said adjacent optical elements, one can measure a progressive variation of altitude. In other words, the altitude transition is continuous if one cannot measure a "step" of altitude along the path linking them. By step, it should be understood an abrupt variation of altitude z of at least 0.10 μm.

Advantageously, the continuous altitude transition improves the solidity of the lens element and improves its aesthetic. Indeed, the continuous altitude transition render the first and second areas less visible on the lens element. Moreover, because of the continuous altitude transition, the manufacturing process and the coating process of the lens element are improved in terms of resources, time and cost.

Alternatively, the altitude transition between the first and second areas alternating on the lens element may be discontinuous.

In the sense of the disclosure, the altitude transition between adjacent areas is discontinuous if along the path linking said adjacent optical elements, one can measure a "step" of altitude along the path linking them. By step, it should be understood an abrupt variation of altitude z of at least 0.10 μm.

The lens element 10 can be made using different technologies like direct surfacing, molding, casting or injection, embossing, filming, or photolithography etc. . . .

The lens element 10 comprising the first and second areas may be partially or entirely encapsulated in an optical device. For example, the lens element 10 may be done with a wafer injected and overmolded, or glued on the lens. Optionally the wafer may comprise microstructures. Alternatively, the lens element 10 may be covered by a coating. Alternatively, the lens element 10 may be covered by a microstructured film embossed done by flat hot embossing or by roll to roll, then laminated or glued on the lens. Alternatively, the lens element 10 may be done by injection molding from a microstructured mold then protected by a film laminated. Alternatively, the lens element 10 may be done by imprinting microstructures on the lens then covering the lens with a film laminated, or may be done by imprinting of a film which is laminated on the lens.

Optionally at least part of first areas of the lens element 10 comprise a spherical shaped front face. Alternatively, at least part of first areas of the lens element 10 comprise an aspherical shaped front face. Alternatively, at least part of first areas of the lens element 10 comprise a rotationally symmetrical aspherical shaped front face.

The disclosure further relates to a mold for obtaining a lens element intended to be worn in front of an eye of a person to suppress or reduce progression of abnormal refractions of the eye such as myopia or hyperopia.

Figure 7:
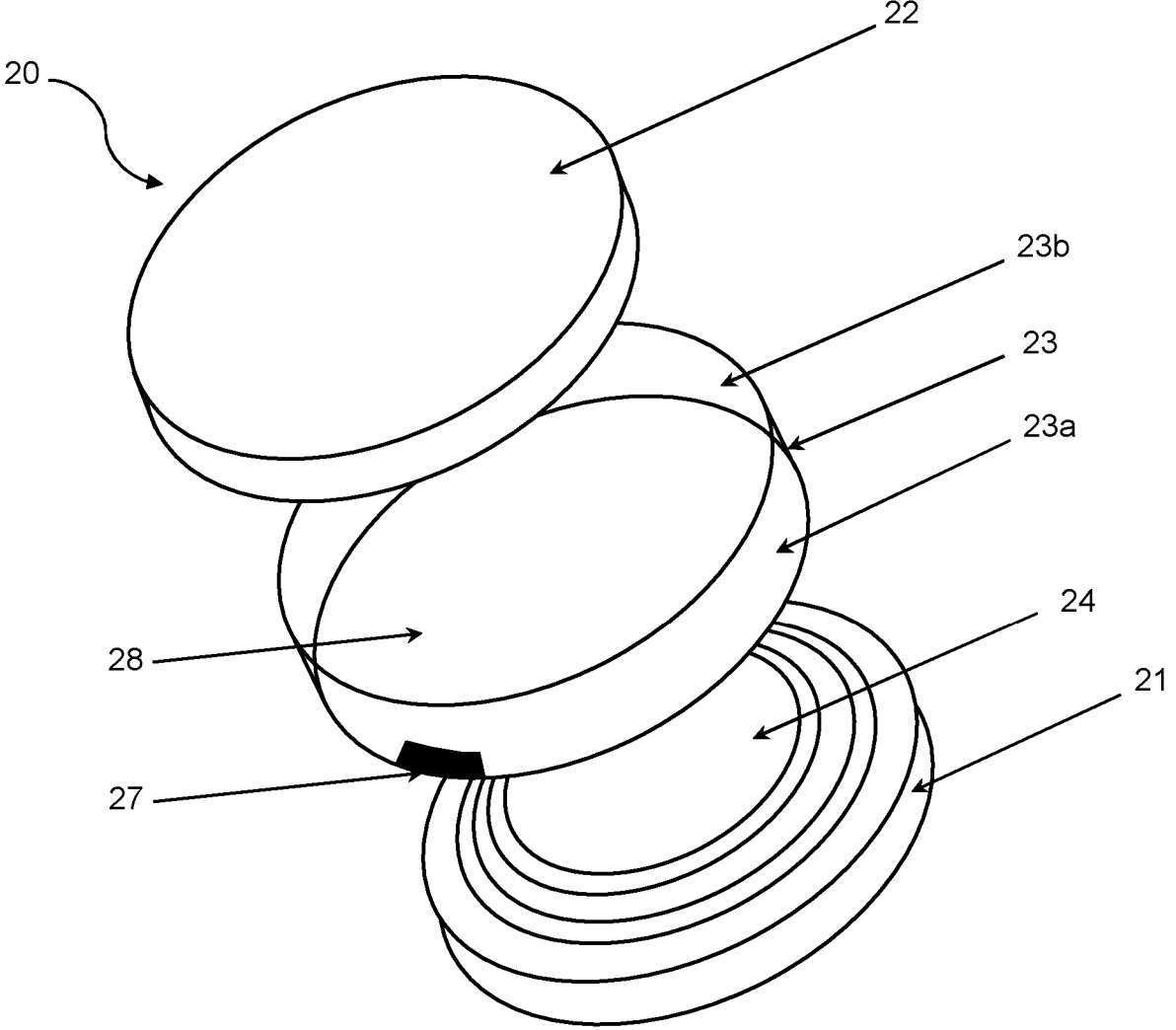
FIG. 7 illustrates a mold for obtaining a lens element according to an embodiment of the disclosure.

As illustrated in FIG. 7, the mold 20 for a lens element 10 comprises a first molding element 21, a second molding element 22.

The first molding element 21 has a first surface 24. The first surface 24 comprises at least two first areas having a first surface curvature. For example, the first areas have a spherical surfacic curvature. The second surface 24 further comprises a plurality of second areas having a second surfacic curvature. For example, the second surfacic curvature is a non-spherical, for example an aspherical, curvature. The first surfacic curvature of the first areas significantly differs from the second surfacic curvature of the second areas.

Preferably, the first areas of the surface of the first molding element correlates with the first areas 12 of the lens element 10 to be provided and the second areas of the surface of the first molding element correlate with the second areas 14 of the lens element 10 to be provided.

As illustrated in FIG. 7, the mold 20 for the lens element 10 further comprises a second molding element 22. The second molding element 22 has a second surface 25. In FIG. 7, the second surface 25 of the second molding element 22 is not represented as it faces the first surface 24 of the first molding element.

The first and second molding elements 21 and 22 form a molding cavity 28. The molding cavity 28 is defined by the first surface 24 of the first molding element 21 comprising the first and second areas, and with the second surface 25 of the second molding element 22.

Alternatively, the mold 20 for the lens element 2 may further comprises a gasket 23. The gasket 23 has an annular form comprising an inner surface 23a and an outer surface 23b. The gasket 23 may comprises an opening 27. In such case, the molding cavity is defined by the first surface 24 of the first molding element 21, the second surface 25 of the second molding element 22, and the inner surface 23a of the gasket 23.

The molding cavity 28 of the mold 20 for a lens element 10 is filled with a molding material through the opening 27. Despite being represented in the gasket 23, the opening 27 may alternatively be placed on the first molding element or the second molding element.

For example, the molding material may be a casting material poured into the molding cavity through the opening 27 of the gasket 23. The casting material in the molding cavity is further polymerized into a lens material thereby forming the lens element 10.

Alternatively, the molding material may be a thermo-plastic material. The thermo-plastic material which is in a first liquid state at a first temperature is injected into the mold cavity 28 through opening 27. During the cooling process, the thermoplastic material changes from a first liquid state to a second solid state corresponding to the lens material of lens element 10.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A lens element intended to be worn in front of an eye of a wearer, the lens element comprising:
   at least two first areas having a first optical function in a specific wearing condition, the first optical function having a refractive power and based on a prescription of the wearer for the eye of the wearer; and
   a plurality of second areas having at least a second optical function in specific wearing conditions,
   wherein when considering at least one first radial path (Pth_R (θ1)) crossing at least a first second area in a first point (<r1, θ1>) and a second point (<r2, θ1>), the first and second points are adjacent to the at least two first areas, radial coordinate r2 is greater than radial coordinate r1, and a first radial optical power at the first point (<r1, θ1>) is different from a second radial optical power at the second point (<r2, θ1>),
   wherein when considering that at least two points (<r3, θ2>) and (<r4, θ2>) define a second radial path (Pth_R (θ2), and at least one orthoradial path (Pth_OR (θ1,θ2)) is between the first and second radial paths, a mean sphere power along the orthoradial path (Pth_OR (θ1, θ2) is substantially constant, and the orthoradial path (Pth_OR (θ1,θ2)) is greater than or equal to 18 degrees.

2. The lens element according to claim 1, wherein along the at least one first radial path (Pth_R (θ1)), evolution of radial optical power between the first and second points is strictly monotonous.

3. The lens element according to claim 2, wherein the first and second areas alternate over the lens element, and
   wherein along at least one radial path crossing the at least two first areas and at least one of the plurality of second areas, a transition of radial optical power between said adjacent first and second areas is discontinuous.

4. The lens element according to claim 1, wherein the first and second areas alternate over the lens element, and
   wherein along at least one radial path crossing the at least two first areas and at least one of the plurality of second areas, a transition of radial optical power between said adjacent first and second areas is discontinuous.

5. The lens element according to claim 1, wherein the first and second areas alternate over the lens element, and
   wherein along at least one radial path crossing at least one first area and at least one of the plurality of second areas, a transition of radial optical power between said adjacent first and second areas is continuous.

6. The lens element according to claim 1, wherein an altitude transition between adjacent first and second areas is continuous.

7. The lens element according to claim 1, wherein an altitude transition between adjacent first and second areas is discontinuous.

8. The lens element according to claim 1, wherein the second optical function is a non-spherical optical function.

9. The lens element according to claim 8, wherein the non-spherical function is an aspherical function.

10. The lens element according to claim 1, wherein the plurality of second areas are organized in complete or portions of concentric rings.

11. The lens element according to claim 10, wherein the second areas have different optical function.

12. The lens element according to claim 10, wherein the second areas are centered on an optical center of the lens element.

13. The lens element according to claim 1, wherein the second optical function varies with an eccentricity of the second areas to a geometrical center of the lens element.

14. The lens element according to claim 1, wherein an absolute value of the difference between mean optical power of at least one point of the at least two first areas and mean optical power of one point of one of the second areas is comprised between 0.50 and 15.0 D.

15. A mold for obtaining the lens element according to claim 1, the mold comprising:

a first molding element having a first surface; and a second molding element having a second surface, wherein the first surface of the first molding element and the second surface of the second element form a molding cavity in which a molding material is to be filled.

16. A lens element intended to be worn in front of an eye of a wearer, the lens element comprising:

a first area having a first optical function in a specific wearing condition, the first optical function having a refractive power and based on a prescription of the wearer for the eye of the wearer; and a plurality of second areas having at least a second optical function in specific wearing conditions, wherein when considering at least one first radial path (Pth_R ($\theta$1)) crossing at least a first second area in a first point (<r1, $\theta$1>) and a second point (<r2, $\theta$1>), the first and second points are adjacent to the first area and radial coordinate r2 is greater than radial coordinate r1, and a first radial optical power at the first point (<r1, $\theta$1>) is different from a second radial optical power at the second point (<r2, $\theta$1>), wherein when considering that at least two points (<r3, $\theta$2>) and (<r4, $\theta$2>) define a second radial path (Pth_R ($\theta$2), and at least one orthoradial path (Pth_OR ($\theta$1,$\theta$2)) is between the first and second radial paths, a mean sphere power along the orthoradial path (Pth_OR ($\theta$1, $\theta$2) is substantially constant, and the orthoradial path (Pth_OR ($\theta$1,$\theta$2)) is greater than or equal to 18 degrees.

* * * * *